United States Patent [19]

Petrov et al.

[11] 4,160,365

[45] Jul. 10, 1979

[54] COMPRESSION IGNITION ENGINE REGULATION SYSTEM

[75] Inventors: Alexandr P. Petrov; Evgeny S. Kovalevsky; Anatoly F. Kosyak; German G. Bondarev, all of Leningrad, U.S.S.R.

[73] Assignee: Tsentrainy Nauchno-Issiedovatelsky Dizeiny Institut, Leningrad, U.S.S.R.

[21] Appl. No.: 825,161

[22] Filed: Aug. 12, 1977

[30] Foreign Application Priority Data

Aug. 23, 1976 [SU] U.S.S.R. .......................... 2397628(I)

[51] Int. Cl.² ............................................. F02B 37/00
[52] U.S. Cl. ....................................................... 60/606
[58] Field of Search .................. 60/605, 606, 614, 615

[56] References Cited

U.S. PATENT DOCUMENTS

| | | | |
|---|---|---|---|
| 3,163,984 | 1/1965 | Dumont | 60/606 |
| 3,676,999 | 7/1972 | Oldfield | 60/606 |
| 3,925,989 | 12/1975 | Pustelnik | 60/605 X |
| 3,988,894 | 11/1976 | Melchior | 60/606 |

Primary Examiner—Carlton R. Croyle
Assistant Examiner—Michael Koczo, Jr.
Attorney, Agent, or Firm—Haseltine, Lake & Waters

[57] ABSTRACT

A system comprising an engine with a low pressure ratio having an inlet and outlet; a turbocompressor consisting of a turbine having its exhaust side connected with the engine outlet via a gas line, and a compressor having its inlet side connected via an air line with the engine inlet, which turbine and compressor are mounted on a common shaft. A combustion chamber is incorporated in a line communicating with the air and gas lines and provided with a fuel system. An air control valve and a fuel control valve are arranged to control the delivery of air and fuel into the combustion chamber. This is connected to a turbocompressor speed control circuit intended to maintain a predetermined speed during prestarting to provide independent operation of the turbocompressor and the combustion chamber. The turbocompressor speed control circuit is connected with an engine speed pickup.

2 Claims, 2 Drawing Figures

COMPRESSION IGNITION ENGINE REGULATION SYSTEM

The present invention relates to internal combustion engines and has particular reference to compression ignition engine regulation systems.

The invention can be used with particular advantage in the regulation systems of exhaust-turbocharged, low compression ratio, compression ignition engines employed to power vehicles.

It is known to supercharge internal combustion engines by the use of a turbocompressor comprising a compressor and a turbine mounted on a common shaft, the inlet side of the engine being connected with the compressor and the exhaust side with the turbine.

The employment of regulation in supercharged compression ignition engines is an efficient means of matching the performance of the engine and supercharging units, for example, regulation of engine speed and compressor output increases engine power and acceleration.

Regulation of engine speed is effected by the use of an engine speed governor. Regulation of compressor output is effected, for example, by varying the rate of air flow by the use of throttle valves.

Increasing the power output of a compression ignition engine is limited by thermal and mechanical stresses of the engine parts. The endeavour to further increase the power output of compression ignition engines has resulted in decreasing the cylinder compression ratio as compared with the commonly adopted level, thereby providing for meeting the condition of limiting the maximum combustion pressure in the engine cylinders. The decrease in the compression ratio has impaired the conditions of igniting the fuel-air mixture during engine starting. To improve the condition of mixture ignition in the engine cylinders, provision has been made in the prior art of a supercharging system which comprises a turbocompressor whose compressor is connected with the engine inlet side and the turbine is connected with engine exhaust side, and in addition includes a combustion chamber incorporated in the system in parallel with the engine and arranged to connect with the compressor on the inlet side and with the turbine on the exhaust side, said combustion chamber being also connected to a fuel line.

The need for improving acceleration is attendant upon the problem of increasing engine volume power and becomes greater with increase in this specific power output on m.e.p. "Pe" by supercharging.

With the supercharging system known in the prior art, the performance thereof independent of variation in the engine load and speed can be achieved by virtue of regulating the delivery of air and fuel into the combustion chamber.

Lowering the compression ratio as an expedient of limiting maximum combustion pressure for increasing the power of a compression ignition engine results in a difficult engine starting, and under certain conditions ($\epsilon < 9$, $\xi$ = engine compression ratio) starting becomes impossible. In this case, prior to engine starting, the supercharging system is put in operation, the supercharger turbine being powered by the exhaust of the gases burning in the combustion chamber. By progressively increasing delivery of fuel into the combustion chamber, the operation of the supercharging system is brought to the conditions under which the compressor outlet temperature and pressure are suitable for engine starting.

Known in the art is a supercharging system comprising a turbocompressor which consists of a compressor and a turbine mounted on a common shaft and a combustion chamber the inlet side of which is connected with the compressor and the exhaust side with the turbine, said combustion chamber being connected to a fuel line and incorporated in the system in parallel with a compression ignition engine of a low compression ratio. The inlet side of said compression ignition engine is connected with the compressor and the exhaust side is connected with the turbine. The supercharging system also has means for delivering fuel into the combustion chamber and means for metering the delivery of fuel and air into the combustion chamber during starting at the minimum rotational speed of the turbocompressor.

Said supercharging system provides for sure starting of a low compression ratio engine by preliminary compressing the compressor the air supplied into the engine cylinders.

Any regulation involves regulated parameters. With this system, the regulated parameters may be as follows: the pressure and temperature of the gas at the entry to the turbine, boost pressure, the rotational speed of the turbocompressor. The lack of the system for regulating some of the abovesaid parameters results in increase of the engine starting period and inability to regulate the compressor output during part-load engine operation and at engine speeds below the rated values.

Also known in the art is a regulation system of a supercharged compression ignition engine, which system comprises a turbocompressor whose turbine and compressor are mounted on a common shaft, and a combustion chamber incorporated in the system in parallel with the engine, the inlet side of said combustion chamber being connected with the compressor and the exhaust side with the turbine. The engine is provided with an engine speed pickup. A regulatable non-return valve is provided in the air line between the compressor and the combustion chamber. The opening of said non-return valve varies with engine speed in such a manner that air delivery into the combustion chamber increases with decrease in engine speed and decreases with increase in engine speed. The engine and the combustion chamber have a common fuel system. In the fuel line connecting the fuel tank to the combustion chamber is incorporated a regulatable fuel control valve arranged for varying fuel delivery into the combustion chamber. A temperature pickup is provided in the turbine gas flow path, said temperature pickup being connected with the fuel control valve.

Said regulation system varies the speed-power performance of the compression ignition engine involved in such a way that it improves the operation of the associated vehicle, in particular, the acceleration thereof.

The compression ignition engine employing said regulation system has a flatter speed-power curve so that the engine torque at engine speeds below the normal operating rpm substantially exceeds the torque obtainable at the same engine speed without the regulation system. Furthermore, the engine torque can remain constant through the preset range of engine speeds.

The use of said regulation system in compression ignition engines with a low compression ratio fails to provide for sure engine starting inasmuch as said system does not permit the supercharging system to operate independently of the engine operating conditions.

When a compression ignition engine is used to power a vehicle, variation in the mode of loading the engine necessitates changing the speed-power curve, for example, by altering the inclination thereof.

Said regulation system is not sensitive to variations in the mode of engine loading and is not capable of accommodating to new operating conditions.

It is an object of the present invention to provide a regulation system of a compression ignition engine with a low compression ratio, which regulation system will provide for sure engine starting and improvement in engine operating characteristics by virtue of independently regulating the supercharging system over a wide range of engine loads and engine speeds below the normal rpm.

These and other objects are achieved in a compression ignition engine regulation system comprising a turbocompressor which consists of a turbine and a compressor mounted on a common shaft, a low compression ratio compression ignition engine provided with an engine speed pickup, the inlet side of said engine being connected with the compressor and the exhaust side with the turbine, and a combustion chamber incorporated in the system in parallel with the engine, which combustion chamber has its inlet side connected with the compressor and the exhaust side connected with the turbine, said combustion chamber being also connected to a fuel line, an air control valve arranged to regulate air delivery into the combustion chamber and incorporated in the air line, and a temperature pickup located in the gas flow path at the entry of hot gases into the turbine and connected with a fuel control valve arranged to regulate the delivery of fuel into the combustion chamber and incorporated in the fuel line.

According to the invention, the regulation system is provided with a turbocompressor speed control circuit which comprises a turbocompressor speed setting unit and the following series-connected elements: a turbocompressor speed pickup, a comparison unit arranged to compare signals from the turbocompressor speed setting unit with signals from the turbocompressor speed pickup, and a mismatch signal amplifying unit which is connected with the air control valve and the fuel control valve.

The turbocompressor speed control circuit automatically maintains the preset turbocompressor speed from the instant at which air pressure differential originates in the combustion chamber when putting the supercharging system in operation. The maintenance of the preset turbocompressor speed is effected by varying the delivery of fuel and air into the combustion chamber. The control circuit also controls the process of turbocompressor acceleration in accordance with the acceleration program which is determined by the properties of the turbocompressor and the engine and is carried into effect by means of the setting unit.

The regulation system described herein provides for sure starting of a compression ignition engine with a low compression ratio and improves engine operating characteristics by virtue of independent regulation of the supercharging system over a wide range of engine loads and engine speeds below the normal rpm.

The turbocompressor speed control circuit automatically maintains the preset turbocompressor speed and controls the process of turbocompressor acceleration. Furthermore, said circuit controls turbocompressor speed over a wide range of engine part-load by setting up the supercharging system operating conditions under which the best engine acceleration is obtained.

It is desirable that the turbocompressor speed setting unit be connected with the engine speed pickup.

The connection between the engine speed pickup and the turbocompressor speed control circuit, in particular with the speed setting unit, makes it possible to account for delay in the gas-dynamic process taking place in the turbine flow path at the change of the inlet gas temperature and pressure due to decrease or increase of engine speed and to set up, through the turbocompressor speed setting unit, another turbocompressor speed. On the other hand, said connection provides a feedback feature and affords certain closeness of turbocompressor speed regulation, whereby the performance of the supercharging system is caused to match the altered engine speed, providing the required engine torque for the vehicle operating conditions involved. In this way the inclination of the engine speed-power curve can be changed.

The regulation system which constitutes the present invention is designed for regulating the supercharging system in the process of starting thereof and automatic matching of engine characteristics with those of the supercharging system during part-throttle operation. This system provides engine prestarting air preparation and affords substantial increase of engine torque, viz. 1.5–2 times at engine speeds of 50 to 70% of $N_{nom}$ (engine rated speed).

Said regulation system can be used on all compression ignition engines having a supercharging system with a combustion chamber. According to the data obtained by economy analysis, the additional cost involved by manufacture of the regulation system gives a relative increase of 20–35 percent, the total percentage in the cost of the supercharging system being within 10 percent, whereas engine power is increased 2–2.5 times and acceleration is improved at least 50 percent.

Now the invention will be described in detail with reference to the accompanying drawing in which.

Figure 1:
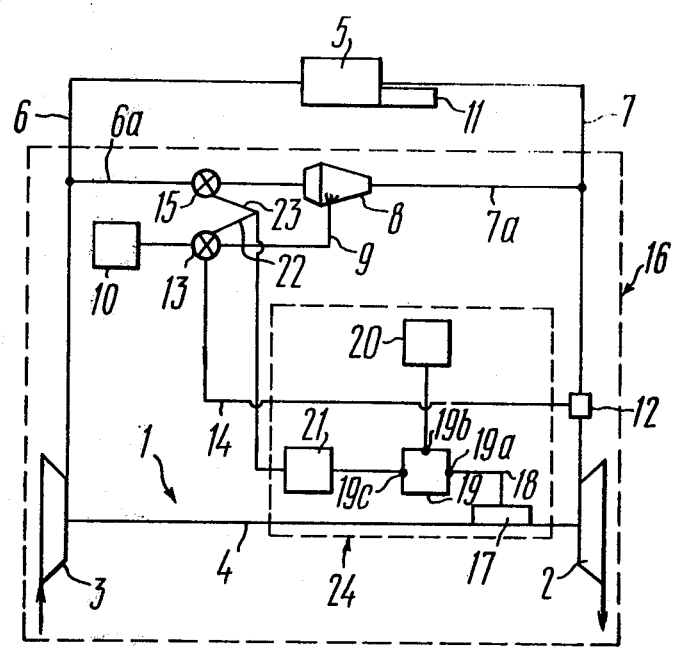
FIG. 1 is a schematic diagram of the compression ignition engine regulation system, including the turbocompressor speed control circuit.

The compression ignition engine regulation system constituting the present invention comprises a turbocompressor 1 (FIG. 1) which consists of a turbine 2 and a compressor 3 mounted on a common shaft 4, and a low compression ratio compression ignition engine 5 the inlet side of which is connected via a line 6 with the compressor 3 and the exhaust side is connected via a line 7 with the turbine 2. A combustion chamber 8 is incorporated in the system in parallel with the engine 5. The inlet side of the combustion chamber 8 is connected via a line 6a with the compressor 3 and the exhaust side of said combustion chamber is connected via a line 7a with the turbine 2. The combustion chamber 8 is also connected via a fuel line 9 to a fuel pump 10. The engine 5 is provided with an engine speed pickup 11. The air line 6 communicates with the line 6a, whilst the exhaust line 7 communicates with the line 7a. Incorporated in the exhaust line 7, at the entry of hot gases into the turbine 2, is a temperature pickup 12 connected via a line 14 with a fuel control valve 13 which is arranged to control the delivery of fuel into the combustion chamber 8 and is incorporated in the fuel line 9. An air control valve 15 arranged to control the delivery of air into the combustion chamber 8 is incorporated in the air line 6a. The turbocompressor 1 and the combustion chamber 8 connected therewith, the fuel line 9, the fuel pump 10, and the valves 13 and 15 form the supercharging system. Inside the casing of the compressor 3 is installed a turbocompressor speed pickup 17 which is connected via a line 18 with a comparison unit 19. The comparison unit 19 has two inputs, viz. an input 19a connected with the turbocompressor speed pickup 17 and an input 19b connected with a turbocompressor speed setting unit 20. The comparison unit 19 has an output 19c which is connected through an amplifying unit 21 and a line 22 with the fuel control valve 13 and via a line 23 with the air control valve 15. The turbocompressor speed pickup 17, the comparison unit 19, the turbocompressor speed setting unit 20, the amplifying unit 21, the shaft 4 of the turbocompressor 1, and the lines 22 and 23 form a turbocompressor speed control circuit 24, more particularly a circuit for controlling the speed of the shaft 4 of the turbocompressor 1.

When starting the supercharging system 16 prior to starting the engine 5, the combustion chamber 8 and the turbocompressor 1 are put in operation by the use of a special starting device (not shown). The speed setting unit 20, acting according to a special program which is compiled with respect to the characteristics of the supercharging system 16, brings the engine speed to the necessary speed. The signal from the speed setting unit 20 is compared with the signal from the turbocompressor speed pickup 17, said signal being proportional to the actual speed of the turbocompressor. The resultant mismatch signal is amplified by the amplifying unit 21 and is fed to servomechanisms (not shown) of the control valves 13 and 15, said valves decreasing the delivery of air and fuel. This permits of raising the temperature of the gases issuing from the combustion chamber 8 and to increase the gas exhaust sufficiently to accelerate the turbocompressor 1 to the rpm at which the compressor pressure ratio increases and the temperature of the air in the line 6 is suitable for self-ignition in the cylinders of the engine 5, whereby the conditions favourable for engine starting are provided. After the engine 5 has been started and warmed at an idling speed, the delivery of air and fuel into the combustion chamber 8 is set to a minimum by the action of the turbocompressor speed setting unit 20, the control circuit 24 actuating the servo elements of the valves 13 and 15. Thereafter the turbocompressor 1 operates on the exhaust from the engine 5.

When a large torque is needed during part-load operation, the nature of load variation being known as described above, the turbocompressor speed setting unit 20 and the control circuit 24 are used to set the operation of the supercharging system 16 to a greater compressor output by virtue of increasing the delivery of fuel and air into the combustion chamber 8.

If the temperature of gases in the gas inlet line 7 rises above the limits permissible with regard to the thermal strength of the parts of the turbine 2, the temperature pickup 12 sends a signal to the control valve 13 for the latter to decrease fuel delivery and thereby limit temperature rise.

It is known that the rate of air and gas flow through the turbine 2 decreases with decrease in the speed of the engine 5. The speed of the turbocompressor 4 and the air output of the compressor 3 decrease accordingly.

Figure 2:
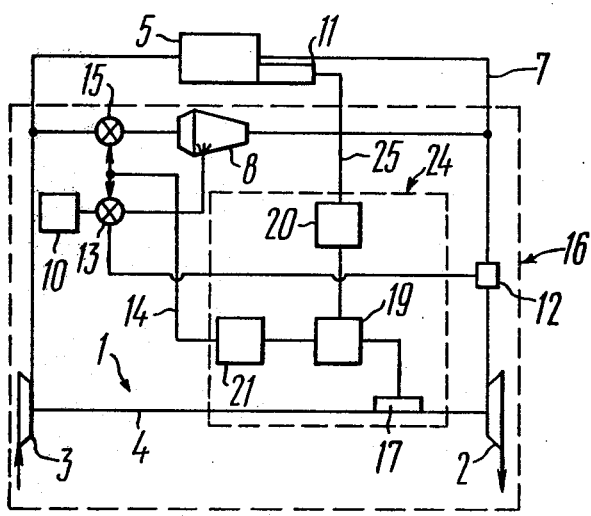
FIG. 2 is a schematic diagram of the compression ignition engine regulation system wherein the turbocompressor speed setting unit is connected with the engine speed pickup.

The engine speed pickup 11 is connected via the line 25 with the turbocompressor speed setting unit 20 (FIG. 2).

The slowing down of the engine 5 is accompanied by decrease of gas flow through the turbine 2 and decrease in the speed of the turbocompressor 1. The speed pickup 17 registers the drop of the speed of the turbocompressor 1 and the speed pickup 11 registers the drop of the speed of the engine 5. The speed pickup 11 sends a signal through the line 25 and the speed setting unit 20 to the comparison unit 19. The resultant mismatch signal is amplified by the amplifying unit 21 and is fed to the servomechanisms of the control valves 13 and 15, whereby the delivery of fuel and air into the combustion chamber 8 is increased. The total gas flow and temperature in the line 7 increase, which results in speeding up the turbocompressor 1 with consequent increase in the output from the compressor 3. Under these conditions the engine 5 can burn more fuel at a lower speed, whereby the engine torque is increased and acceleration is improved.

The mismatch signal at the output 19c diminishes to zero. By varying the amplification factor in the line 25, the inclination of the engine speed-power curve can be altered.

Thus, the regulation system consituting the present invention features simple operation and provides for regulating, independently of the engine, the supercharging system 16 in the process of starting same and accelerating the turbocompressor over a wide range of loads and engine speeds below the rated values.

What is claimed is:

1. A compression ignition engine regulation system comprising: a turbocompressor; a turbine forming part of the turbocompressor; a compressor disposed in said turbocompressor and driven by said turbine; a turbocompressor shaft mounting said turbine and said compressor; a compression ignition engine with a low pressure ratio having an air inlet and exhaust outlet, and a crankshaft formed thereof; an air line in communication with said inlet of said engine and said compressor; an exhaust gas line in communication with said outlet of said engine and said turbine; a portion of a further air line connected to said air line; a portion of a further exhaust gas line connected to said exhaust gas line; a combustion chamber having inlet means connected to said portion of the air line and having outlet means connected to said portion of the exhaust gas line in parallel with said engine; a fuel line connected to said combustion chamber; an air control valve arranged to control the delivery of air into said combustion chamber and being formed in said portion of the air line between said combustion chamber; a temperature pickup disposed in said exhaust gas line at the point of entry of hot gases into said turbine; a fuel control valve arranged to control the delivery of fuel into said combustion chamber, said valve being in said fuel line and controlled by said temperature pickup; a turbocompressor speed control circuit comprising, a turbocompressor speed setting unit, a turbocompressor speed pickup, a comparison unit having a first input connected with the output of said setting unit and second input connected with the output of said speed pick-up; and an amplifying unit having an input connected to the output of said comparison unit, the output of said amplifying unit is connected with said air control valve for controlling the delivery of air into said combustion chamber and to said fuel control valve for controlling the delivery of fuel into said combustion chamber, for automatic control of the turbocompressor speed in different modes.

2. A compression ignition engine regulation system as claimed in claim 1, comprising: a speed pick-up mounted on said crankshaft of said engine; and the output of said crankshaft speed pickup is connected with said turbocompressor speed setting unit for correcting a setting signal.

* * * * *